United States Patent [19]

Knudsen

[11] Patent Number: 4,689,129
[45] Date of Patent: Aug. 25, 1987

[54] PROCESS FOR THE PREPARATION OF SUBMICRON-SIZED TITANIUM DIBORIDE

[75] Inventor: Arne K. Knudsen, Midland, Mich.

[73] Assignee: The Dow Chemical Company, Midland, Mich.

[21] Appl. No.: 755,393

[22] Filed: Jul. 16, 1985

[51] Int. Cl.⁴ ............................................. C01B 35/04
[52] U.S. Cl. ................................. 204/157.41; 423/297
[58] Field of Search ................. 204/157.1 R, 157.1 L, 204/157.41; 423/289, 297

[56] References Cited

U.S. PATENT DOCUMENTS

| | | | |
|---|---|---|---|
| 3,244,482 | 4/1966 | Culbertson et al. | 423/297 |
| 3,334,967 | 8/1967 | Bourdeau | 423/439 |
| 3,340,020 | 9/1967 | Neuenschwander et al. | 423/439 |
| 3,600,291 | 8/1971 | Wiley | 204/157.61 |
| 3,979,500 | 9/1976 | Sheppard et al. | 423/289 |
| 4,012,301 | 3/1977 | Rich et al. | 204/157.41 |
| 4,022,872 | 5/1977 | Carson et al. | 423/297 |
| 4,045,359 | 8/1977 | Fletcher et al. | 422/186 |
| 4,063,896 | 12/1977 | Merritt et al. | |
| 4,233,131 | 11/1980 | Ratcliffe et al. | |
| 4,233,277 | 11/1980 | Sheppard et al. | 423/297 |
| 4,265,843 | 5/1981 | Dias et al. | 264/57 |
| 4,282,195 | 8/1981 | Hoekje | 423/289 |
| 4,302,508 | 11/1981 | Hierholzer et al. | 428/367 |
| 4,330,382 | 5/1982 | Yardley et al. | 204/157.61 |
| 4,338,173 | 7/1982 | Yardley et al. | 204/157.61 |
| 4,343,687 | 8/1982 | Ronn | 204/157.1 R |
| 4,353,885 | 10/1982 | Hoekje | 423/289 |
| 4,446,169 | 5/1984 | Castle et al. | 427/53.1 |
| 4,447,303 | 5/1984 | Jensen et al. | 204/157.22 |
| 4,568,565 | 2/1986 | Gupta et al. | 204/157.41 |

FOREIGN PATENT DOCUMENTS

| | | |
|---|---|---|
| 59899 | 9/1982 | European Pat. Off. . |
| 0124901 | 11/1984 | European Pat. Off. ..... 204/157.1 H |
| 1445856 | 6/1966 | France . |
| 2232619 | 4/1976 | France . |
| 062251 | 12/1981 | Japan . |
| 1069748 | 5/1967 | United Kingdom . |
| 1148325 | 4/1969 | United Kingdom . |

OTHER PUBLICATIONS

Cannon et al, JACS, vol. 65, No. 7 (Jul. 1982) pp. 324–335.
Kivel, J. Chem. Phys., vol. 68, No. 12 (Jun. 1978) pp. 5378–5382.
Marra et al, Ceram. Eng. Sci. Proc., vol. 3, No. 3 (1982) pp. 3–19.
Karlov et al, ZHETF Pis. Red., vol. 14, No. 4 (Aug. 20, 1971) pp. 214–217.
Niemyski et al, J. Physics & Chem. of Solids, Suppl. No. 1 (1967) pp. 229–233.
Schramm, Laser-Induced Processes in Molecules, Kompa and Smith, Springer-Verlag (1979) pp. 274–276.

Primary Examiner—Arthur P. Demers
Attorney, Agent, or Firm—Barbara J. Sutherland

[57] ABSTRACT

Ultrafine titanium diboride powder is produced by subjecting a gaseous mixture of $BCl_3$, $H_2$, and $TiCl_4$ to an amount of laser radiation effective to convert at least a portion of the volatile boron and titanium sources to titanium diboride. The $TiB_2$ powders consist primarily of monodispersed equiaxial particles having a diameter of about 0.025 micron to about 0.3 micron.

16 Claims, 1 Drawing Figure

PROCESS FOR THE PREPARATION OF SUBMICRON-SIZED TITANIUM DIBORIDE

FIELD OF THE INVENTION

The present invention relates to an improved process for the preparation of essentially pure and ultrafine titanium diboride powders ($TiB_2$), a relatively high cost refractory material used in the manufacture of ceramic parts.

BACKGROUND OF THE INVENTION

A significant impediment to the increased use of ceramic materials in certain applications is the high incidence of failures in engineered ceramic parts. These failures can often be attributed to small cracks or voids in such parts, which result from incomplete packing of the precursor powders. One solution to this problem is the manufacture of monodispersed powders which can be packed tightly, thereby reducing the void spaces between particles.

Current efforts in ceramic technology are directed toward the manufacture of ceramic parts that exhibit the desirable physical properties of the material, e.g., hardness, maintenance of structural integrity at high temperatures, and chemical inertness, with the elimination of impurities and defects which often result in failure of the ceramic. It has been suggested, by E. A. Barringer and H. K. Bowen, in "Formation, Packing and Sintering of Monodispersed $TiO_2$ Powders", J. Amer. Ceram. Soc. 65, C-199 (1982), that an "ideal" ceramic powder for producing a high quality part must be of high purity and contain particles which are monodispersed, spherical, nonagglomerated and of a particle size 0.1–1.0 micron in diameter.

As a ceramic powder is sintered, adjacent particles fuse into grains. In general, the grain size is governed by the crystallite size within the particles from which the part is prepared. In other words, the grain size is necessarily larger than the crystallites from which a part is sintered. Thus, the sintering of finer particles presents the opportunity to produce fine-grained bodies.

An additional advantage in the use of ceramic powders with a fine uniform particle size is that the temperatures required to sinter the powders are often reduced. In one work describing sintering $TiO_2$ powders, two researchers, Barringer and Bowen, found that the sintering temperature could be reduced from 1300°–1400° C. to 800° C. when using 0.08 micron-sized particles. On an industrial scale, this could result in a considerable savings both in material and energy costs.

Titanium diboride powder ($TiB_2$) may be prepared by a number of methods including the reaction of elemental and crystalline titanium and boron compounds at high temperatures (2000° C.), the reduction of the oxides, the reaction of a titanium source with boron carbide, or the vapor-phase reaction of titanium halides with boron halides (chlorides and bromides) in a hydrogen plasma. In the latter process, the endothermic reaction is driven by heating the reactants to a temperature significantly above the spontaneous reaction temperature in a hydrogen plasma to form submicron titanium diboride particles. The major fraction of particles comprising the powder product have a particle size in the range between 0.05 and 0.7 micron. The resultant titanium diboride powder can be hot pressed or cold pressed and sintered to articles having densities of at least 90, e.g., 95 percent of theoretical. U.S. Pat. No. 4,282,195 describes one such process for preparing submicron titanium boride powder from titanium tetrachloride and boron trichloride in a vortex-stabilizing hydrogen plasma. These plasma produced powders consist of a mixture of both submicrons and micron-sized particles. In most cases, the powders contain a substantial fraction of particles (as much as 10 percent) with diameters greater than one micron. In addition, the powders contain a large amount (4000 ppm) of metal impurities, introduced by the plasma apparatus itself.

The synthesis of ceramic powders using a carbon dioxide laser was first developed by Haggerty and coworkers. In their article, "Synthesis and Characteristics of Ceramic Powders Made from Laser-Heated Gases", Ceram. Eng. Sci. Proc. 3, 31 (1982), wherein R. A. Marra and J. S. Haggerty describe the preparation of silicon, silicon carbide and silicon nitride powder by driving exothermic reactions involving $SiH_4$. The ultrafine powders produced are equiaxed, and mono-dispersed with particle sizes in the range of 0.01–0.1 micron. Marra and Haggerty further state that this laser-heated process can be used to produce other and nonoxide ceramics such as $TiB_2$, aluminum nitride (AlN), boron carbide ($B_4C$), as well as many oxide ceramics. See: Sinterable Ceramic Powders From Laser-Driven Reactions, Process Description and Modeling," W. R. Cannon, S. C. Danforth, J. H. Flint, J. S. Haggerty, and R. A. Marra, J. Amer. Ceram. Soc. 65, 324 (1982), J. Amer. Ceram. Soc. 65, 330 (1982); "Synthesis and Characteristics of Ceramic Powders made from Laser-Heated Gases," R. A. Marra and J. S. Haggerty, Ceram. Eng. Sci. Proc., 3, 31 (1982); "Apparatus for Making Ultrafine Particles", Jpn. Kokai Tokkyo Koho. JP 56-13664 A2 [81-136664] 26, Oct., 1981; and "Submicron Titanium Boride Powder", U.S. Pat. No. 4,282,195 (1981).

SUMMARY OF THE INVENTION

A process for the preparation of substantially pure, ultrafine titanium diboride powder, which comprises subjecting a continuous stream of reactant gases consisting essentially of a volatile boron and a volatile titanium source, and at least a stoichiometric amount of hydrogen calculated on the boron source at an absolute pressure of at least about 0.7 atm., to at least an amount of laser radiation effective to convert at least a portion of the volatile boron and titanium sources to titanium diboride.

TERMS

As used herein, the term "ultrahigh purity" refers to titanium diboride ($TiB_2$), which is at least 99 weight percent pure $TiB_2$. The term "high purity" titanium diboride, refers to $TiB_2$ which is at least about 94 weight percent pure. The term "substantially pure" refers to titanium diboride which is at least 75 weight percent $TiB_2$.

The term "a source of hydrogen" refers to a source capable of providing hydrogen of a suitable purity to produce titanium diboride ($TiB_2$) in a reaction using a volatile titanium source and a volatile boron source.

The term "ultrafine particle" means particles having a diameter of less than 1 micron ($\mu m$).

The term "fine particle size" refers to particles having a diameter of over 1 micron ($\mu m$).

The term "monodispersed powder" refers to a powder having a distribution of particles which are all about the same size in diameter.

The term "volatile boron source" means a boron-containing material which is a gas at the temperature at which the boron-containing material is injected into the reactant stream. Volatile boron sources which may be used in the present process invention can include trimethyl borate and diborane. Other volatile boron sources can include alkyl borons, such as trimethyl boron, alkyl borates, such as trimethyl borate, boron hydrides, such as diborane, and boron halides, such as boron tribromide. A preferred boron source is boron trichloride.

The term "volatile titanium source" means a titanium containing material which can be vaporized and incorporated into the gaseous reactant stream. Examples of volatile titanium sources which may be used in the present process include the titanium halides, e.g., titanium chlorides, titanium bromides, and titanium iodides, as well as the titanium alkoxides, e.g., titanium tetramethoxide, titanium tetraethoxide, etc. Mixed halogen/alkoxide compounds may also be used. Titanium tetrachloride ($TiCl_4$), however, is a preferred volatile titanium source. For the remainder of the case, titanium tetrachloride will be recited as the volatile titanium source, this being done for the ease of reading only and it is not to be construed that $TiCl_4$ is the only operable volatile titanium source where $TiCl_4$ is used in the specification.

The term "reactant gases" refers to the gases which are employed, because of their titanium, boron, and/or hydrogen content, to form $TiB_2$ when subjected to laser radiation.

The term "yield percent" refers to the mass of product, which is assumed to consist entirely of titanium diboride ($TiB_2$), calculated in relation to the amount of $BCl_3$ added as reactant using the formula:

Yield Percent$=(2m_p/M)/(ft/P/RT)$ where $m_p$ is the mass of the recovered sample, M is the molecular weight of $TiB_2$ (69.5 g/mol), f is the $BCl_3$ flow rate (cc/min), t is the reaction time (min), P is atmospheric pressure (assumed to be 1 atm.), T is the ambient temperature (25° C.), and R is the gas constant (0.0821 l atm./mol K).

BRIEF DESCRIPTION OF THE DRAWING

The FIGURE is a schematic drawing of apparatus suitable for practicing the process of the invention.

DETAILED DESCRIPTION OF THE INVENTION

Figure 1:
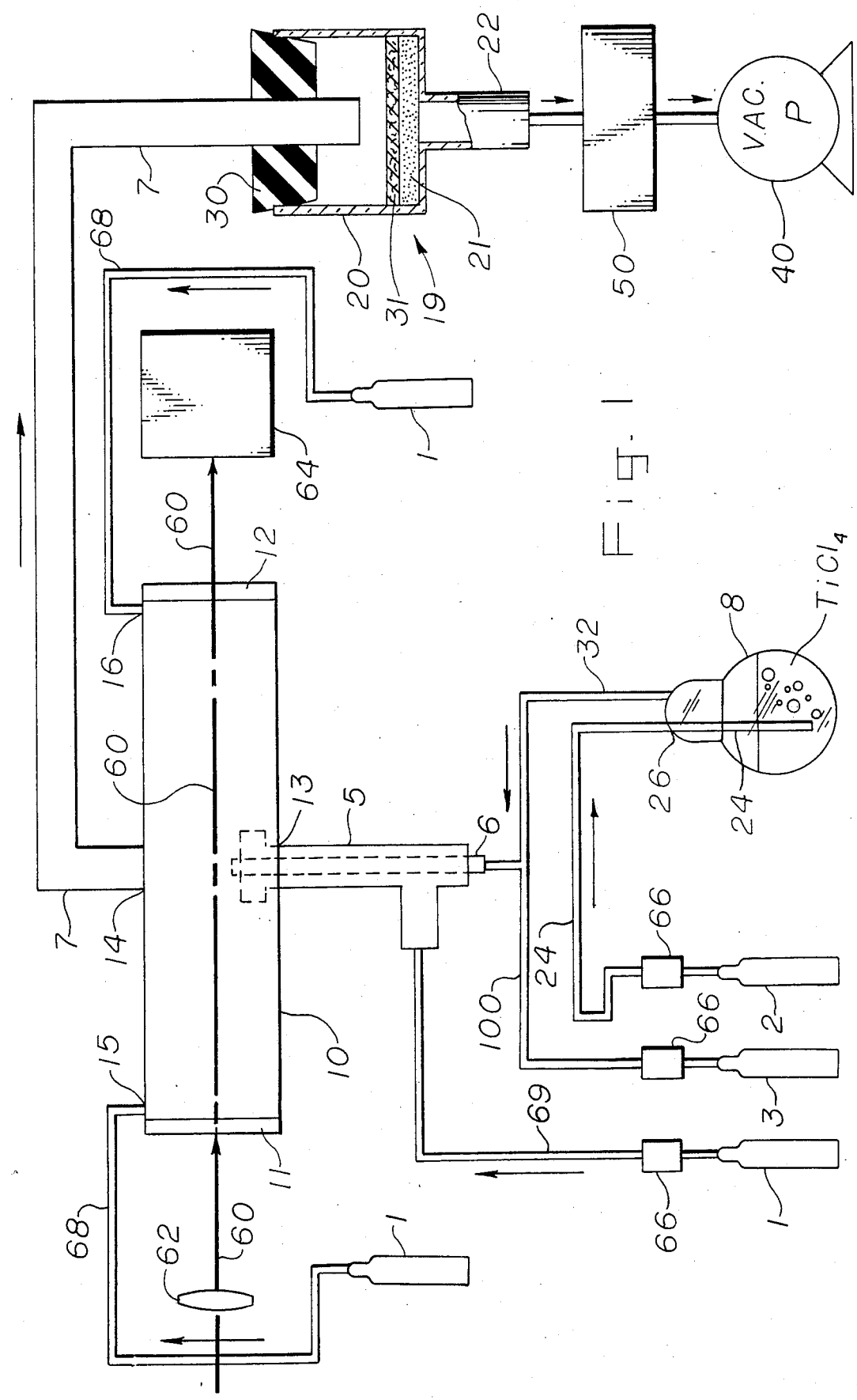

An example of the synthesis of substantially pure, ultrafine titanium diboride powder from a gaseous mixture of a volatile boron source, hydrogen, and a volatile titanium source involves irradiating the gaseous mixture with a laser beam, preferably having a wavelength of about 10.6 microns, thereby causing the gaseous mixture to absorb photons. The overall stoichiometry of the reaction is illustrated by means of the equation:

$$TiCl_4 + 2BCl_3 + 5H_2 \rightarrow TiB_2 + 10HCl \quad (1)$$

This particular reaction is endothermic; $\Delta H$ at 298° C. is +103 kcal/mol.

Given these stoichiometric ratios, the preferred volumetric flow rate ranges for the reactant gases appropriate to the scale used in the examples are as follows:

(a) Boron trichloride ($BCl_3$) preferably has a flow rate in the range of about 10 to about 80 cc/min with a preferred mode of operation at about 40 cc/min. This range is not limited to the range of 10 to 80 cc/min because when the flow rates of the non-$BCl_3$ reactant gases are increased, and the mole ratios are maintained, then the flow rate for $BCl_3$ can be accordingly increased to properly correspond to the above noted mole ratio given in equation (1);

(b) Hydrogen ($H_2$) preferably has a flow rate in the range of about 0 to about 300 cc/min, with a preferred mode of operation at about 200 cc/min. As with the $BCl_3$, this flow rate range is only limited with respect to the mole ratios set forth in equation (1). The $H_2$ flow rates can be altered to match the flow rates of the other reactant gases, $BCl_3$ and $TiCl_4$; and (c) Titanium tetrachloride ($TiCl_4$) preferably has a flow rate in the range of about 1 to about 90 cc/min with a more preferred range of about 1 to about 72 cc/min, with a preferred mode of operation at about 72 cc/min. As with the rate of flow for $BCl_3$ and $H_2$, this flow rate range can be altered to correspond to the flow rates of the outer reactant gases, $H_2$ and $BCl_3$.

This exemplary reaction can be carried out in a reactor suitable for effecting the reaction. One such reactor is illustrated schematically in the FIGURE. In the FIGURE, the reactor 10 is a cylindrical Pyrex glass reactor with potassium chloride windows 11 and 12 firmly attached at either end of the reactor 10. The reactor 10 has a centrally located entrance port 13 and a centrally located exit port 14 positioned opposite entrance port 13. A stainless steel inlet tube 5 is fitted in gas tight connection with both an entrance port 13 and an argon source 1. A smaller gas inlet tube 6 is mounted concentrically in inlet tube 5 with an open end thereof extending into reactor 10 and the other end of tube 6 in gas tight connection with the sources of the reactant gases, hydrogen source 2, titanium source 8, and boron trichloride source 3. One end of a gas outlet tube 7 is mounted in gas tight connection to exit port 14 of reactor 10 and the other end of gas outlet tube 7 is fitted in gas tight connection into the top of a funnel 20 by a rubber stopper 30. Funnel 20 preferably is a Pyrex Buchner funnel further containing a glass filter 21 and a collection tube 22.

It should be noted that other reactors can be used within the scope and teachings of this invention. For instance, a reactor constructed of stainless steel or another corrosion resistant material would be acceptable as the body material for reactor 10. Other variations in reactor 10 which fall within the scope of the invention include the use of alternative window materials (e.g., germanium, zinc selenide, or gallium arsenide). Also, alternative powder collection devices known in the art could be utilized instead of funnel 20 and the resultant apparatus invention would still be within the scope of the inventive teaching. For example, electrostatic precipitators or cyclones could accommodate the continuous operation of the reactor, thereby ensuring steady state conditions for powder collection.

In one method of operating the apparatus invention illustrated in the FIGURE, an argon gas purge is introduced by tubing 68 proximate each window via ports 15 and 16 and also concentric to the reactant gas stream via tube 69 and inlet tube 5 into entrance port 13. The window purge serves to prevent both window overheating and the accumulation of material on the window surfaces. The concentric flow of argon serves to entrain the titanium diboride particles in the gas stream as they are formed. Purge gases could also be used in connection with reactor 10 and fall within the inventive teachings (e.g., nitrogen or helium).

Hydrogen gas 2 is introduced into vaporizer 8 containing liquid $TiCl_4$ through tubing 24. Boron trichloride gas 3 is injected directly into the reactant stream 10 through tubing 100. All gas flow rates are monitored with gas flow controllers 66. The $H_2/TiCl_4$ gas mixture from reactor 8 is evacuated through tubing 32 which is in fluid communication with the inner tube 6. Tubes 32 and 5 can be heated to about 70° C. (±50° C.) to maintain the temperature of the reactants in tubes 32 and 5 at a temperature above that of the reactants in vaporizer 8 and thereby prevent the condensation of $TiCl_4$. Boron trichloride 3 from tubing 100 is mixed with reactant gases $H_2$ and $TiCl_4$ in tube 32 prior to the introduction of these reactant gases into inner tube 6. Typical $BCl_3$ and $H_2$ flow rates are about 40 and about 200 cc/min. The typical total argon flow rate from tube 1 through tube 68 to windows 12 is about 750 cc/min. The preferred aspect is the relative concentrations i.e., 40 cc/min $BCl_3$ for 0 to 300 cc/min $H_2$. Alternatively, if the $H_2$ flow rate is maintained at 200 cc/min, the $TiCl_4$ flow rate can be varied in the range of about 1 to about 75 cc/min.

The argon 1 is only used to cool the potassium chloride (KCl) windows 11 and 12 which prevents window breakage during the reaction.

The reactant gases can be heated before injection into reactor 10, preferably to a temperature of about 70° C. (±50° C.). When the reactant gas is heated over its boiling point, then the pressure of the hydrogen boron trichloride and argon has to be adjusted such that the pressure of the $BCl_3$, $H_2$ and argon would be greater than the vapor pressure of the $TiCl_4$. The $TiCl_4$ reservoir is preferably maintained at a temperature of between about 25° C. and about 130° C. The pressure in the cell is maintained at about 0.9 atmosphere.

At low pressures in the reactor, the yield of $TiB_2$ is markedly diminished. When the pressure is regulated by a throttle valve, the pumping rate is increased which subsequently causes a decrease in the overall pressure in the reactor. Below a pressure of about 0.5 atm., the primary product produced in the reactor is $TiCl_3$. This appears to be a function of the flame temperature. As the effective flow velocity of the reactants is increased, the residence time of the reactants in the laser beam is decreased, resulting in the absorption of fewer photons per $BCl_3$ molecule. A lower flame temperature below the spontaneous reaction temperature of the reactant gases for the formation of $TiB_2$ results in the formation of a thermodynamically less disfavored product, $TiCl_3$, over the desired highly endothermic product, $TiB_2$.

Titanium diboride powder entrained in the gas stream leaves the reactor via exit port 14, travels through gas outlet tube 7 and is collected on a filtration device 19. Device 19 in one embodiment can comprise a filter paper disc 31 mounted on the glass filter 21 (40–60 micron pore size) of Buchner funnel 20. Gases leave the system via collection tube 22, which is connected in gas tight connection to a corrosive gas vacuum pump 40 which is protected by a liquid nitrogen trap 50 which traps condensible materials. An inert fluorocarbon pump oil is used in the pump to prevent gross oil decomposition. The pressure within the reactor is monitored by a conventional Bourdon gauge (not shown) and is regulated by controlling the vacuum pumping rate through a throttling value (also not shown).

In an alternative embodiment, no vacuum pumping is necessary. In yet another embodiment, a gas scrubber can be added to the apparatus invention at a point wherein the gas scrubber is in fluid communication with the vacuum pump. Alternatively, this scrubber can be in direct connection with the filtration device and operates to eliminate undesirable materials from the gas stream.

The reaction is endothermic below about 1000° C. The reaction could be driven utilizing a lower laser power, less than 100 watts at the reaction zone, provided the starting gaseous mixture is heated, e.g., up to about 1,000° C. (but below the temperature at which the stream of reactant gases react in the abscence of laser energy).

Continuing with the FIGURE, the output beam 60 of a $CO_2$ laser operates at 115 watts (W) at the source and 100 watts (W) at the reaction zone when using a Coherent Model 40 laser operating multimode at 10.6 microns. The laser is focused to generate an intensity of about 1–10 $kw/cm^2$ within the jet of reactant gases entering the reactor 10. The beam 60 travels through the front KCl window 11 and out the rear KCl window 12. An anti-reflection, dielectric-coated zinc-selenide lens 62 with a 5 inch focal length is used to focus the beam. However, a defocused beam can be used, that is, the beam can be defocused so that the focal point of the beam is located either in front of or behind a flame produced when the laser beam intersects the gaseous mixture. Titanium diboride powder nucleates and forms in the flame. For lens 62, the preferred distance between the combustion nozzle formed by the open end of inlet tube 6 projecting into entrance port 13 and the laser focal point is about 0.75 inches. The size of the laser spot at the point of impact on the reactant gases is preferably the same diameter as the diameter of the reactant gas stream, however, the diameter of the laser spot can be less than the diameter of the reactant gas stream. Alternatively, the laser spot can have a diameter greater than the diameter of the reactant gas stream and remain within the scope of the inventive teachings. The transmitted laser beam 60, after passing through window 12, is monitored by a pyroelectric power meter 64.

In alternative embodiments, the power of the laser could be varied, ranging from an operating power of about 100 watts up to about 25,000 watts. With a laser having an output power significantly greater than the laser used in this embodiment, producing 115 W at the source and 100 W in the reaction zone, the reactor 10 and accompanying optics, such as lens 62, and KCL windows 11 and 12, would require modifications to accommodate the increase in power.

The yield and purity of the titanium diboride, $TiB_2$, obtained in the process of this invention using the apparatus of the FIGURE is determined by a number of interrelated process variables. For example, the concentration of $TiCl_4$ in the reactant stream affects both the purity and overall yield of the recovered product. In this embodiment, the $TiCl_4$ concentration was controlled by varying the temperature of the $TiCl_4$ bath which in turn, varied the vapor pressure of $TiCl_4$ in the $H_2$ stream. In general, the amount of material collected in the filter increased with the $TiCl_4$ concentration in the reactant stream. At concentrations significantly above stoichiometric (BCl$_3$/TiCl$_4$<about 0.4), titanium-rich impurities (e.g., TiCl$_3$) are formed and thus collected in the recovered product. Therefore, a TiCl$_4$ concentration corresponding to a BCl$_3$/TiCl$_4$ ratio of about 0.4:1 to about 15:1, preferably about 0.4:1 to about 5:1, and most preferably about 0.4:1 to about 3:1 is employed.

The hydrogen concentration also has a dramatic effect on the yield and purity of the recovered product. Hydrogen provides a reducing environment for the boron chloride and titanium tetrachloride in the reaction flame. However, excess hydrogen also results in a cooler flame and thus a lower yield of titanium diboride. Therefore, a hydrogen flow corresponding to a range from about 50 to about 500 mole percent, preferably about 75 to about 400 mole percent, and most preferably about 100 to about 200 mole percent of the stoichiometric amount based on the boron concentration is employed.

The temperature and reactant gas concentrations, as well as laser power also affect yield percent and purity of the titanium diboride powder. The reactant flame temperature is strongly dependent on the laser intensity since the amount of energy absorbed by the reactant gases is dependent on the incident photon intensity. Therefore, the laser power can exceed about 1400 W/cm$^2$ in a reactor where the reactants are not preheated more than about 100° C. ($\pm$100° C.). In configurations involving preheating the reactants over about 100° C. ($\pm$100° C.), substantially lower laser intensities may be utilized.

The laser spot size near the reactant nozzle also affects yield and purity of the resultant powder. In the preferred embodiment, shown in FIG. 1, the preferred spot size is 1 mm. The diameter of the laser beam spot size can be varied without departing from the scope of the invention. The distance between the focusing lens and the reactant gas stream can also be varied and yet remain within the scope of the invention. The laser beam diameter is usually limited to beam diameter which is about equal to the diameter of the reactant gas stream.

The pressure at which the reaction is conducted also can affect the purity and/or yield percent of the titanium diboride powder. A pressure in the range of over about 0.7 atm. can be used. A preferable pressure range is between about 0.7 and about 2 atm., with a preferred pressure of about 0.95 atm. Below about 0.7 atm., the collected powder consists primarily of titanium trichloride (TiCl$_3$). It is believed that a pressure of more than about 2 atm. will work within the scope of the invention provide ultrafine, substantially pure titanium diboride particles are formed.

The use of an inert gas entrainment stream through tube 5, e.g. argon or helium, in the stream of reactant gases may be used to enhance the yield, but is not required for each embodiment of the process.

As an alternative to the use of BCl$_3$ as the only boron source, another volatile boron source can be used in conjuntion with boron trichloride, e.g. diborane or boron tribromide, BBr$_3$. A boron source, such as trimethyl borate, which absorbs CO$_2$ laser radiation (trimethyl borate at 9.5 microns), or alternatively, diborane which absorbs CO$_2$ laser radiation (diborane at about 10.6 microns), could be used in the absence of boron trichloride.

Since a stoichiometric excess of BCl$_3$ is employed in the preferred inventive process, the unreacted BCl$_3$ and TiCl$_4$ can be preferably recycled to the reactor, after separation of HCl therefrom (if any) in any conventional manner.

the titanium diboride, TiB$_2$, produced according to the process of this invention is substantially pure. It also consists of ultrafine particles. In particular, the process of the invention can produce ultrafine particles, preferably ranging in diameter from about 0.05 micron to about 0.3 micron, with the median particle size being about 0.08 micron. Alternatively, the process of this invention can produce ultrafine particles ranging in diameter from about 0.025 to about 0.3 micron with an average particle size of between about 0.08 and about 0.17 as detailed in the following Table I.

EXAMPLES

The following is the procedure employed in a typical Example, Example 1, depicted on the following Table.

Using a new, preweighed filter paper disc and washed Buchner funnel, the reactor system of FIG. 1 was purged with argon. The vaporizer 8 containing titanium tetrachloride and transfer tubes 32, 6 and 5 were heated to 80° C. and 140° C., respectively. The argon window purge was then initiated at a flow rate of 750 cc/min. Immediately thereafter, the BCl$_3$ and H$_2$ flows were started at rates of 60 and 200 cc/min, respectively. Hydrogen was introduced into the solution of titanium tetrachloride (TiCl$_4$) at a rate of 7.5 millimoles/minute. The hydrogen mixed with the vapors of the TiCl$_4$ to produce a flow rate of about 2.8 millimoles/minute of TiCl$_4$. Through regulation of the pump throttle valve, the reactor pressure was maintained at about 0.74 atm. pressure in the reactor. The laser beam was then allowed to enter the cell with the concomitant appearance of the luminescent flame. TiB$_2$ particles immediately began to appear on filter paper 31. Vacuum pumping was maintained at an average rate of 1100 cc/min once the reaction was initiated. After a predetermined period of time (typically 15 min), the laser beam was blocked off and the reactant flow halted. The reactor was opened to the air and the filter paper and product were weighed. The weight of product per mole of BCl$_3$ introduced into the reactor was then used as a quantitative measure of reaction efficiency to produce a yield percent of 24.6 yield percent. The yield percent depended on the amount of BCl$_3$ introduced into the system. The product produced has a purity that was substantially pure.

The following Table illustrates Examples 2 through 12 which were performed the same as Example 1, except the flow rate of the BCl$_3$ was modified from 2.2 millimoles per minute as in the preferred example to a rate of 1.5 millimoles per minute. Examples 2 through 12 use the apparatus and method of Example 1 while varying the amounts and flow rates of TiCl$_4$, H$_2$ and in certain runs, varying laser power. As the flow rates were changed in the numbered Examples, the vacuum pumping rate was also changed depending on the flow of the reactants, using the relationship: 750 cc/min (maintained as a flow rate for argon)+the flow rate in cc/min for H$_2$, BCl$_3$, and for TiCl$_3$=vacuum pumping rate.

TABLE

Titanium Diboride Synthesis Examples

| Examples[1] | TiCl$_4$[2] | H$_2$[2] | Initial Laser Power Watts | Temperature | Yield(%) | Absolute Particle Size(μm) | Average Particle Size(μm) |
|---|---|---|---|---|---|---|---|
| 1  | 2.8   | 7.5  | 115 | 80° C.  | 11.5          | 0.05–0.3      | 0.08          |
| 2  | 0.053 | 7.5  | 115 | 4° C.   | 4.5           | 0.025–0.17    | 0.08          |
| 3  | 0.10  | 7.5  | 115 | 22° C.  | 9.2           | 0.067–0.28    | 0.13          |
| 4  | 0.32  | 7.5  | 115 | 44° C.  | 11.1          | 0.07–0.30     | 0.13          |
| 5  | 0.58  | 7.5  | 115 | 60° C.  | 16.8          | 0.05–0.32     | 0.15          |
| 6  | 1.23  | 7.5  | 115 | 80° C.  | 18.6          | Not Available | Not Available |
| 7  | 1.55  | 7.5  | 115 | 90° C.  | 19.3          | 0.11–0.27     | 0.15          |
| 8  | 2.14  | 7.5  | 115 | 100° C. | 22.2          | 0.11–0.33     | 0.17          |
| 9  | 2.94  | 7.5  | 115 | 110° C. | 24.6          | 0.11–0.28     | 0.12          |
| 10 | 0.94  | 1.9  | 115 | 120° C. | 7.6           |               |               |
| 11 | 1.9   | 3.8  | 115 | 120° C. | 15.8          |               |               |
| 12 | 2.8   | 5.7  | 115 | 120° C. | 27.2          |               |               |
| A  | 3.73  | 7.5  | 115 | 120° C. | 31.1*         |               |               |
| B  | 4.26  | 7.5  | 115 | 130° C. | 28.9*         |               |               |
| C  | 5.5   | 7.5  | 115 | 137° C. | TiCl$_3$      |               |               |
| D  | 5.6   | 11.3 | 115 | 120° C. | 56*           |               |               |
| E  | 3.2   | 11.3 | 115 | 100° C. | 45*           |               |               |
| F  | 3.73  | 7.5  | 100 | 120° C. | 32*           |               |               |
| G  | 3.73  | 7.5  | 75  | 120° C. | 0             |               |               |
| H  | 3.73  | 7.5  | 50  | 120° C. | 0             |               |               |

[1]The flow rate of boron trichloride throughout these examples was kept constant at 1.5 millimoles per minute, with the exception of Example 1, wherein the BCl$_3$ was kept at a constant rate of 2.2 millimoles per minute. The pressure throughout these examples was kept constant at 0.9 (±0.1) atm. in the reactor.
[2]Flow rates in millimoles per minute.
*Indicates presence of substantial amount of impurities e.g., an amount of impurities greater than 25% of the weight percent of the compound.

Examples A through F illustrate that at high TiCl$_4$ flow rates, a product containing a substantial fraction of impurities is produced. These impurities consist of titanium chlorides (e.g., TiCl$_4$ and TiCl$_3$) which could be removed by standard chemical or physical means to yield at least substantially pure TiB$_2$.

Examples G and H are included to illustrate that when certain conditions exist, a low laser power does not produce a mole yield percent of product. The laser beam must have an energy sufficient to heat the reaction beyond the spontaneous reaction temperature of the reactant gases.

Examples 1 through 12 collectively demonstrate the utility of the invention for the preparation of pure, ultrafine titanium dibromide particles. These Examples are not intended to be construed to represent an optimization study of the inventive process and method as to any particular flow rate of reactant gases or laser power.

The preceding examples can be repeated with similar success by substituting the generically or specifically described reactants and/or operating conditions of this invention for those used in the preceding examples.

What is claimed is:

1. A process for the preparation of substantially pure, ultrafine titanium diboride powder, which comprises subjecting a continuous stream of reactant gases consisting essentially of a volatile boron source and a volatile titanium source, the amount of said sources corresponding to a ration of from about 0.4:1 to about 15:1 and from about 100 to about 500 mole percent of the stoichiometric amount of hydrogen calculated on said boron source at an absolute pressure of at least about 0.7 atm., to at least an amount of laser radiation effective to convert at least a portion of the volatile boron and titanium sources to titanium diboride, said laser radiation having a wavelength suitable to be absorbed by said reactant gases.

2. The process according to claim 1, wherein said absolute pressure is in the range of about 0.7 atm. to about 2 atm.

3. The process according to claim 1, wherein said boron source comprises a member of the group comprising of an alkyl boron, an alkyl borate, a boron hydride and a boron halide.

4. The process according to claim 1, wherein the hydrogen is present in an amount of from about 100 to about 400 mole percent of the stoichiometric amount of a boron source in the starting gas mixture.

5. The process according to claim 4, wherein the hydrogen is present in an amount of from about 100 to about 200 mole percent of the stoichiometric amount of a boron source in the starting gas mixture.

6. The process according to claim 1, wherein the laser provides a power of at least about 100 watts.

7. The process according to claim 1, wherein said volatile titanium source is titanium tetrachloride.

8. The process of claim 1, which comprises bubbling said continuous stream of reactant gases through a heated solution of titanium tetrachloride and subjecting the resultant gases directly to an amount of laser radiation effective to convert at least a portion of the boron trichloride and titanium tetrachloride to titanium diboride.

9. A process for the preparation of substantially pure, ultrafine titanium diboride powder, which comprises bubbling a continous stream of hydrogen gas through a heated solution consisting essentially of titanium tetrachloride, mixing the resultant vapor with boron trichloride in an amount corresponding to a boron trichloride/titanium tetrachloride (BCl$_3$/TiCl$_4$) ratio within the range of about 0.4:1 to about 15:1, subjecting the mixed vapors to a pressure of at least about 0.7 atm., and subjecting the result to an amount of CO$_2$ laser radiation effective to convert at least a portion of the boron trichloride to titanium diboride.

10. The process of claim 9, wherein the mixed vapors are subjected to a pressure within the range of about 0.7 atm. to about 2 atm.

11. The process of claim 9, wherein the resultant vapor is mixed with the boron trichloride in an amount corresponding to a boron trichloride/titanium tetrachloride (BCl$_3$/TiCl$_4$) ratio within the range of about 0.4:1 to about 5.0:1.

12. The process of claim 9, wherein said ultrafine titanium diboride powder is a high purity titanium diboride powder.

13. The process of claim 9, wherein said ultrafine titanium diboride powder is an ultrahigh purity titanium diboride powder.

14. The process of claim 9, wherein said ultrafine titanium diboride powder has a diameter within the range of about 0.025 to about 0.3 micron.

15. The process of claim 14, wherein said ultrafine titanium diboride powder has a diameter within the range of about 0.08 to about 0.17 micron.

16. The process of claim 9, wherein said ultrafine titanium diboride powder consists of particles which are monodispersed and equiaxed.

* * * * *

UNITED STATES PATENT AND TRADEMARK OFFICE
CERTIFICATE OF CORRECTION

PATENT NO. : 4,689,129

DATED : August 25, 1987

INVENTOR(S) : Arne K. Knudsen

It is certified that error appears in the above-identified patent and that said Letters Patent is hereby corrected as shown below:

Column 1, line 65 please delete "range" and insert -- range of --.

Column 2, line 3 please delete "vortex-stabilizing" and insert -- vortex-stabilized --.

Column 2, line 5 please delete "submicrons" and insert -- submicron --.

Column 3, line 40 please delete "(ft/P/RT)" and insert -- (ftP/RT) --.

Column 4, line 26 please delete "outer" and insert -- other --.

Column 4, line 43 please delete "connectionto" and insert -- connection to --.

Column 6, line 4 please delete "value" and insert -- valve --.

Column 6, line 18 please delete "abscence" and insert -- absence --.

Column 6, line 54 please delete "as lens" and insert -- as the lens --.

Column 6, line 64 please delete "$TiCl_4$bath" and insert -- $TiCl_4$ bath --.

Column 6, line 65 please delete "$TiCl_4$in" and insert -- $TiCl_4$ in --.

Column 7, line 55 please delete "provide" and insert -- provided --.

Column 7, line 64 please delete "conjuntion" and insert -- conjunction --.

Column 8, line 8 please delete "the" and insert -- The --.

UNITED STATES PATENT AND TRADEMARK OFFICE
CERTIFICATE OF CORRECTION

PATENT NO. : 4,689,129

DATED : August 25, 1987

INVENTOR(S) : Arne K. Knudsen

It is certified that error appears in the above-identified patent and that said Letters Patent is hereby corrected as shown below:

Column 9, line 41 please delete "dibromide" and insert -- diboride --.

Column 9, line 55 please delete "ration" and insert -- ratio --.

Column 9, line 67 please delete "said" and insert -- the --.

Column 9, line 68 and Column 10, line 28 please delete "com-prising" and insert -- consisting --.

Column 10, line 51 please delete "continous" and insert -- continuous --.

Signed and Sealed this

Seventeenth Day of October, 1989

Attest:

DONALD J. QUIGG

Attesting Officer

Commissioner of Patents and Trademarks